United States Patent
Bukurak et al.

(10) Patent No.: US 8,904,550 B2
(45) Date of Patent: Dec. 2, 2014

(54) SELECTION OF SANDBOX FOR INITIATING APPLICATION

(75) Inventors: David Bukurak, Ottawa (CA); Benjamin Altman, Mississauga (CA)

(73) Assignee: Blackberry Limited, Waterloo, Ontario (CA)

(*) Notice: Subject to any disclaimer, the term of this patent is extended or adjusted under 35 U.S.C. 154(b) by 226 days.

(21) Appl. No.: 13/534,178

(22) Filed: Jun. 27, 2012

(65) Prior Publication Data

US 2014/0007254 A1 Jan. 2, 2014

(51) Int. Cl.
*G06F 7/04* (2006.01)
*G06F 21/53* (2013.01)
*G06F 21/60* (2013.01)

(52) U.S. Cl.
CPC ............... *G06F 21/60* (2013.01); *G06F 21/53* (2013.01)
USPC .......................................................... 726/27

(58) Field of Classification Search
USPC ................ 713/164, 165, 167; 726/17, 27–30; 709/206, 207
See application file for complete search history.

(56) References Cited

U.S. PATENT DOCUMENTS

| | | | |
|---|---|---|---|
| 2005/0060532 A1 | 3/2005 | Dorenbosch et al. | |
| 2006/0136911 A1* | 6/2006 | Robinson et al. | 718/1 |
| 2006/0230452 A1 | 10/2006 | Field | |
| 2009/0249366 A1 | 10/2009 | Sen et al. | |
| 2010/0071025 A1* | 3/2010 | Devine et al. | 726/1 |
| 2010/0192224 A1 | 7/2010 | Ferri et al. | |
| 2011/0045806 A1 | 2/2011 | Gupta et al. | |
| 2011/0053574 A1 | 3/2011 | Rice | |
| 2011/0061008 A1 | 3/2011 | Gupta et al. | |
| 2011/0083131 A1 | 4/2011 | Pirzada et al. | |
| 2012/0290945 A1 | 11/2012 | Byrne et al. | |

OTHER PUBLICATIONS

Research in Motion Limited, About BlackBerry Balance—User Guide—Blackberry Playbook Tablet—2.0, docs.blackberry.com/en/smartphone_users/.../About_BlackBerry_Balance_1868156_11.jsp 1/, retrieved Jun. 6, 2012.

Halevy, Ronen; BerryReview—BlackBerry Playbook Security & Encryption with Mobile Fusion Explained—BerryReview, berryreview.com/2012/02/22/blackberry-playbook-security-encryption-with-mobile-fusion-explained/, pp. 1-5, Feb. 22, 2012, retrieved Jun. 6, 2012.

SYBASE, An SAP Company, Enterprise Applications Mobility Matters, blogs.sybase.com/carolynfitton/tag/enterprise-applications/, pp. 1-4, Jan. 25, 2012, retrieved Jun. 6, 2012.

Gorhring, Nancy; PCWorld Business Center, PCWorld.com, Enterproid to Enable Work and Personal Numbers on One Phone, pcworld.com/.../enterproid_to_enable_work_and_personal_numbers_on_one_phone.html, pp. 1-4, Feb. 15, 2012, retrieved Jun. 7, 2012.

(Continued)

*Primary Examiner* — Beemnet Dada
(74) *Attorney, Agent, or Firm* — Oblon, Spivak, McClelland, Maier & Neustadt, L.L.P.

(57) ABSTRACT

Methods and devices selecting a sandbox for initiating an application are described. In one aspect a method includes: providing within a hybrid record access application, a selectable option to access an attachment associated with a record, the record being associated with one of a plurality of sandboxes, the hybrid record access application configured to access records associated with the plurality of sandboxes, the plurality of sandboxes configured to prevent data from moving between different sandboxes; and initiating within the sandbox associated with the record, an application to access the attachment when selection of the selectable option is received.

20 Claims, 6 Drawing Sheets

(56) References Cited

OTHER PUBLICATIONS

Vilches, Jose; Enterproid's Divide separates work from play on Android—TechSpot News, www.techspot.com/news/45771-enterproids-divide-separates-work-from-play-on-android.html, pp. 1-3, Oct. 7, 2011, retrieved Jun. 7, 2012.

Cox, John; Rim promises multi-layered security on BlackBerry 10 OS, Network World US, Techworld.com, news.techworld.com/mobile-wireless/3356516/rim-promises-multi-layered-security-on-blackberry-10-os/2/, pp. 1-4, May 9, 2012, retrieved Jun. 6, 2012.

European Search Report dated Feb. 20, 2014, in European Patent Application No. 12 173 949.4.

Office Action mailed Feb. 14, 2013 in co-pending U.S. Appl. No. 13/651,761.

Office Action dated Sep. 12, 2013, issued in co-pending U.S. Appl. No. 13/651,761, filed Oct. 15, 2012.

European Search Report dated Oct. 19, 2012, issued for European Application No. 12173949.4.

\* cited by examiner

SELECTION OF SANDBOX FOR INITIATING APPLICATION

TECHNICAL FIELD

The present application relates to electronic device security and, more particularly, to the security of files on electronic devices that may be used in different operational contexts.

BACKGROUND

Users sometimes carry more than one electronic device so that they may use different electronic devices for different aspects of their lives. For example, they may carry both a personal electronic device for personal use and may carry a work-issued electronic device for work-related use. Carrying multiple electronic devices which have overlapping capabilities is inefficient. Thus, users may wish to be able to use a single electronic device for both personal and work purposes.

Employers may also benefit when employees are permitted to use a single electronic device for both personal and work purposes. For example, when employees connect their personal electronic device to work-related systems, the personal electronic device may then be used for work purposes, allowing the employer to benefit from increased productivity associated with the use of the electronic device without having to finance the purchase of the electronic device. Thus, shared electronic devices may be advantageous for both employees and employers. However, employers are often concerned about maintaining the integrity and security of work-related files when allowing electronic devices to be used for both work and personal purposes.

Sandbox techniques have been used to allow electronic devices to be used in different operational contexts. Sandboxing maintains a strict separation between business and personal data and applications. Conventionally, such techniques require manual selection and switching between the different operating contexts.

BRIEF DESCRIPTION OF THE DRAWINGS

Reference will now be made, by way of example, to the accompanying drawings which show example embodiments of the present application, and in which.

Like reference numerals are used in the drawings to denote like elements and features.

DETAILED DESCRIPTION

In one example embodiment, the present application describes a method that includes: providing within a hybrid record access application, a selectable option to access an attachment associated with a record, the record being associated with one of a plurality of sandboxes, the hybrid record access application configured to access records associated with the plurality of sandboxes, the plurality of sandboxes configured to prevent data from moving between different sandboxes; and initiating within the sandbox associated with the record, an application to access the attachment when selection of the selectable option is received.

In another example embodiment, the present application describes an electronic device. The electronic device includes a display and a memory storing records associated with a plurality of sandboxes. The sandboxes are configured such that data is prevented from moving between different sandboxes. In electronic device further includes a processor coupled with the display and the memory. The processor is configured to: provide within a hybrid record access application, a selectable option to access an attachment associated with a record, the record being associated with one of a plurality of sandboxes, the hybrid record access application configured to access records associated with the plurality of sandboxes; and initiate within the sandbox associated with the record, an application to access the attachment when selection of the selectable option is received.

In yet another example embodiment, the present application describes a processor readable storage medium comprising processor-executable instruction which, when executed, cause a processor to: provide within a hybrid record access application, a selectable option to access an attachment associated with a record, the record being associated with one of a plurality of sandboxes, the hybrid record access application configured to access records associated with the plurality of sandboxes; and initiate within the sandbox associated with the record, an application to access the attachment when selection of the selectable option is received.

Other example embodiments of the present disclosure will be apparent to those of ordinary skill in the art from a review of the following detailed description in conjunction with the drawings.

Example embodiments of the present disclosure are not limited to any particular operating system, electronic device architecture, server architecture or computer programming language.

Example Electronic Device

Figure 1:
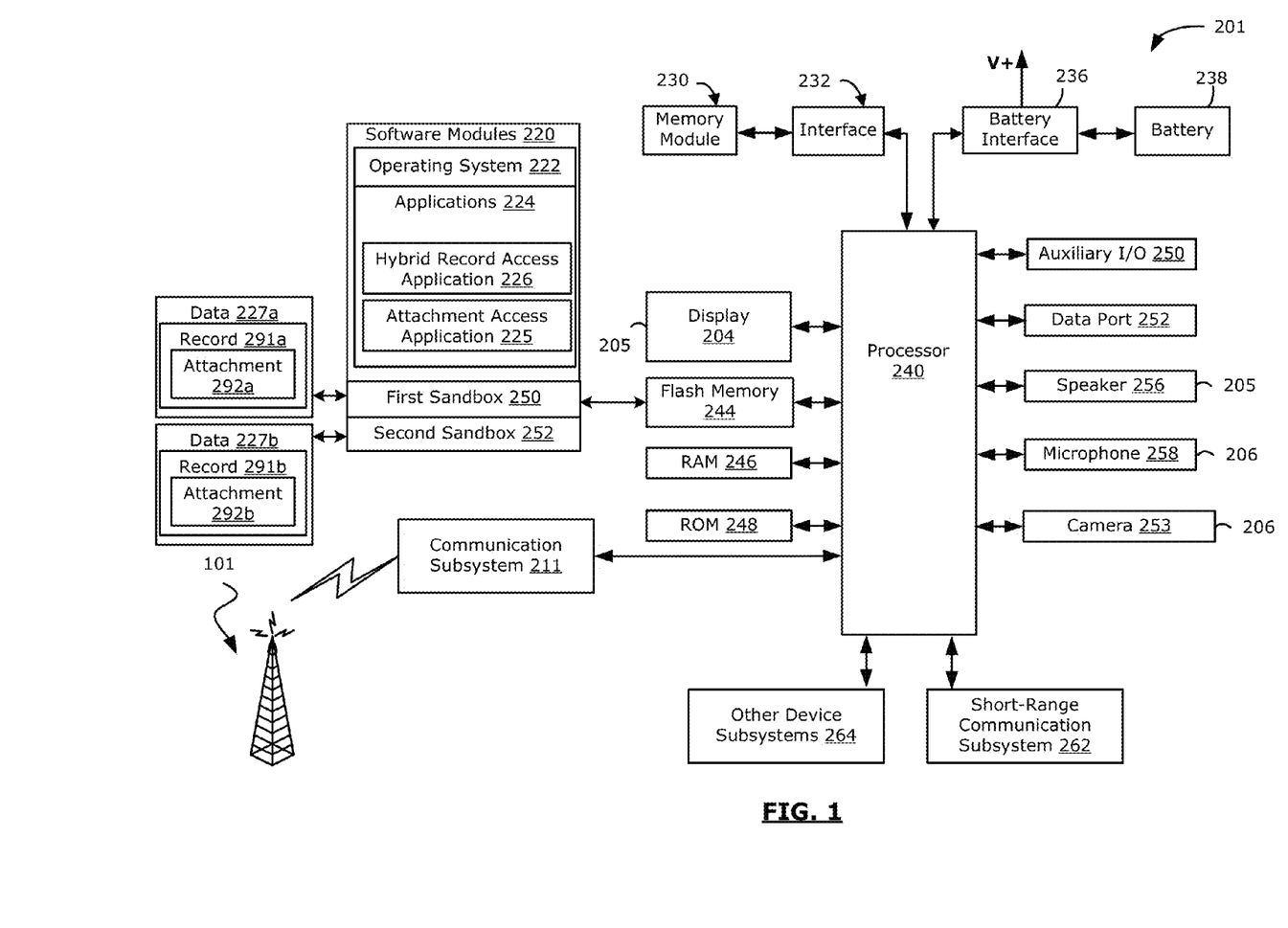
FIG. 1 is a block diagram illustrating an example electronic device in accordance with example embodiments of the present disclosure.

Reference is first made to FIG. 1 which illustrates an example electronic device 201. In the illustrated example embodiment, the electronic device 201 is a communication device, such as a mobile communication device. In at least some example embodiments, the electronic device 201 is a two-way communication device having data and voice communication capabilities, and the capability to communicate with other computer systems, for example, via the Internet. Depending on the functionality provided by the electronic device 201, in various example embodiments the electronic device 201 may be a multiple-mode communication device configured for data and voice communication, a mobile telephone such as a smart phone, a tablet computer such as a slate computer, an electronic book reader, a wearable computer such as a watch, a PDA (personal digital assistant), or a computer system.

A smartphone is a mobile phone which offers more advanced computing capabilities than a basic non-smartphone cellular phone. For example, a smartphone may have an ability to run third party applications which are stored on the smartphone.

A tablet computer (which may also be referred to as a tablet) is an electronic device 201 which is generally larger than a mobile phone (such as a smartphone) or personal digital assistant. Many mobile phones or personal digital assistants are designed to be pocket sized. That is, mobile phones or personal digital assistants are generally small enough to be carried by a person easily, often in a shirt or pant pocket while tablet computers are larger and may not fit within pant pockets. For example, many tablet computers have a height which is seven inches (7″) or more. In some example embodiments, the tablet computer may be a slate computer. A slate computer is a tablet computer which does not include a dedicated keyboard. A slate computer may allow for text input through the use of a virtual keyboard or an external keyboard which connects to the slate computer via a wired or wireless connection.

In at least some embodiments, the electronic device 201 is a handheld electronic device. A handheld electronic device is an electronic device 201 which is sufficiently small to be held in one or more hands of a user. The term handheld electronic device includes smartphones and may also include tablet computers. In at least some embodiments, the handheld electronic device may be sufficiently small to be held in a single hand of a user. For example, the handheld electronic device may be a palm-sized device which is sized to be held in the palm of a user's hand. From the description which follows, it will be appreciated that the techniques and methods described herein may be used in electronic devices 201 having limited display capabilities.

In other example embodiments, the electronic device 201 may be of a type not specifically listed above.

The electronic device 201 includes a housing (not shown) which houses components of the electronic device 201. The internal components of the electronic device 201 are constructed on a printed circuit board (PCB). The electronic device 201 includes a controller including at least one processor 240 (such as a microprocessor) which controls the overall operation of the electronic device 201. The processor 240 interacts with device subsystems, such as a wireless communication subsystem 211 for exchanging radio frequency signals with a wireless network 101 to perform communication functions. The processor 240 interacts with additional device subsystems including one or more input interfaces 206 (such as a keyboard, one or more control buttons, a camera 253, one or more microphones 258, and/or a touch-sensitive overlay associated with a touchscreen display, etc.), flash memory 244, random access memory (RAM) 246, read only memory (ROM) 248, auxiliary input/output (I/O) subsystems 257, a data port 257 (which may be a serial data port, such as a Universal Serial Bus (USB) data port), one or more output interfaces 205 (such as a display 204, one or more speakers 256, or other output interfaces), a short-range communication subsystem 262, and other device subsystems generally designated as 264. Some of the subsystems shown in FIG. 1 perform communication-related functions, whereas other subsystems may provide "resident" or on-device functions.

One or more of the input interfaces 206 may be configured for receiving user input to allow a user to interact with the electronic device 201. Such input interfaces 206 may, for example, allow a user to interact with a graphical user interface provided on the electronic device 201. Instructions, commands, or other forms of input may be received by the electronic device 201 via the input interfaces. For example, the input interfaces 206 may allow a user to interact with one or more interface elements displayed on a graphical user interface of the display 204.

Such input interfaces 206 may take a variety of forms. For example, any one or combination of the following input interfaces 206 may be included on the electronic device 201 and used for receiving user input: a touchscreen display, a control button, a trackball, trackpad, or optical input device, a keyboard, a camera 253 (which may be used, for example, to detect gesture-based input), an orientation or acceleration sensor such as an accelerometer (which may be used, for example, to detect gesture-based input performed by moving the electronic device 201), and/or a microphone 258 (which may be used, for example, to detect voice-based commands). It will be appreciated that the foregoing list of input interfaces 206 is not exhaustive and that other input interfaces 206 may be used instead of or in addition to any of the interfaces 206 described above.

As noted previously, the electronic device 201 may include a touch-sensitive display 204 which may be referred to as a touchscreen or a touchscreen display 204. The touchscreen display 204 may be constructed using a touch-sensitive input surface connected to an electronic controller. The touch-sensitive input surface overlays the touchscreen display 204 and may be referred to as a touch-sensitive overlay. The touch-sensitive overlay and the electronic controller provide a touch-sensitive input interface 206 and the processor 240 interacts with the touch-sensitive overlay via the electronic controller. That is, the touchscreen display 204 acts as both an input interface 206 and an output interface 205.

In some embodiments, the electronic device 201 may communicate with any one of a plurality of fixed transceiver base stations of the wireless network 101 within its geographic coverage area. The electronic device 201 may send and receive communication signals over the wireless network 101 after the required network registration or activation procedures have been completed.

In some example embodiments, the auxiliary input/output (I/O) subsystems 257 may include an external communication link or interface, for example, an Ethernet connection. The electronic device 201 may include other wireless communication interfaces for communicating with other types of wireless networks, for example, a wireless network such as an orthogonal frequency division multiplexed (OFDM) network.

In the example embodiment illustrated, the electronic device 201 also includes a memory module 230 (which may be flash memory) and a memory module interface 232. The memory module 230 may be removable from the electronic device 201. Network access may be associated with a subscriber or user of the electronic device 201 via the memory module 230, which may be a Subscriber Identity Module (SIM) card for use in a GSM network or other type of memory module for use in the relevant wireless network. The memory module 230 may be inserted in or connected to the memory module interface 232 of the electronic device 201.

The electronic device 201 may store data 227*a*, 227*b* in an erasable persistent memory, which in one example embodiment is the flash memory 244. In various example embodiments, the data 227*a*, 227*b* may include service data having information required by the electronic device 201 to establish and maintain communication with the wireless network 101. The data 227*a*, 227*b* may also include user application data including one or more records 291*a*, 291*b*. The records 291*a*, 291*b* may, for example, include email messages, address book and contact information, calendar and schedule information, notepad documents, image files, and other commonly stored user information stored on the electronic device 201 by its user, and other data.

The data 227a, 227b stored in the persistent memory (e.g. flash memory 244) of the electronic device 201 may be organized, at least partially, into a number of databases or data stores each containing data items of the same data type or associated with the same application. For example, email messages, contact records, and task items may be stored in individual databases within the memory of the electronic device 201.

At least some of the records 291a, 291b may include an attachment 292a, 292b. By way of example, in some embodiments, a record 291a, 291b may be an email message (or another type of electronic message) that includes a file as an attachment 292a, 292b. Electronic messages sometimes include attachments 292a, 292b to allow files to be transferred from one location, person, device, or account to another location, person, device or account.

By way of further example, a record 291a, 292b may be a calendar entry that includes a file as an attachment 292a, 292b. Calendar entries may, for example, include attachments 292a, 292b representing data related to an event associated with the calendar entry. For example, content (such as a presentation, document or notes) may be included in the calendar entry to allow such content to be discussed when the event represented by the calendar entry occurs. For example, the attachment 292a, 292b may be an agenda for a meeting. By way of further example, an attachment 292a, 292b included in a calendar entry may represent transportation information related to a calendar entry; for example, directions to the event.

Accordingly, records 291a, 291b associated with the electronic device 201 may include one or more attachments 292a, 292b. An attachment 292a, 292b may represent content or may link to such content (for example, the attachment may provide a link to online content e.g. it may be a Uniform Resource Locator (URL)).

Such content may, for example, be a video (such as, for example, an MPEG video, WMV video, AVI video, etc.), audio (such as, for example, an MP3 audio file, a WAV audio file, a RealAudio audio file, etc.), a word processor document (such as a Microsoft Word™ file, etc.), a spreadsheet (such as a Microsoft Excel™ file), an electronic book (such as an e-book in an EPUB, MOBI, or other file format), a presentation (such as a Microsoft PowerPoint™ presentation), a Portable Document Format (PDF) document, a note (such as a text based note prepared using a note-taking application), or an image (such as a raster, vector or 3D graphic image including, for example, a JPEG file, TIFF file, etc.). The attachment 292a, 292b may represent other types of content apart from those types specifically listed above.

The records 291a, 291b having the attachments 292a, 292b may be received at the electronic device 201 via one or more of the input interfaces 206 or via communication subsystems, such as the communication subsystem 211 or the short-range communication subsystem 262.

Files and non-hybrid applications that access the files can be classified according to a workspace in which the files and/or applications are restricted. The workspace can be one of a plurality of partitioned workspaces in which each workspace is separate from each of the other workspaces such that a tightly-controlled set of resources for controlling entities such as, but not limited to, data files, network connections and hardware and running applications that access the entities provides a security mechanism for separating the launching and running of programs and entities in the different workspaces. Each workspace is generally referred to as a sandbox 250, 252 and may also be referred to as a perimeter. Rule sets can be implemented to provide full control over what processes are started, spawned (by other applications), allowed to access entities such as, but not limited to, data files, network connections, and hardware, or allowed to inject code into other applications. Sandboxing provides a security system where data is prevented from movement between the different areas. More specifically, sandboxes 250, 252 (and other components, and software on the electronic device 201) may be configured such that data is prevented from being moved between different sandboxes 250, 252.

The sandboxes 250, 252 generally allow the electronic device 201 to be used in different operational contexts while maintaining file security. For example, the electronic device 201 may be used for both personal use and also for business use. Business files may, however, be kept separately from personal files (e.g. business files may be kept in a corporate sandbox and personal files may be kept in a personal sandbox and the sandboxes may be walled off from one another so that file transfers between the sandboxes are prevented or controlled).

Accordingly, in at least some embodiments, there can be multiple modes or workspaces provided by the electronic device 201. A non-hybrid application running in one sandbox 250, 252 can access entities such as, but not limited to, data files, network connections, and hardware in the sandbox 250, 252 in which it is running, but can be restricted from accessing and operating on entities such as, but not limited to, data files, network connections, and hardware in another sandbox.

Accordingly, data 227a, 227b may be securely separated into sandboxes 250, 252. A non-hybrid application may separately operate on the data 227a, 227b in a sandbox 250, 252 in which that application is running but may not access data 227a, 227b in another sandbox.

For example, the system may be partitioned into two workspaces (as secure workspaces, i.e., sandboxes) such as a corporate sandbox and a personal sandbox. The data and files in the corporate sandbox can be strictly separated from non-hybrid applications or programs running the personal sandbox. This secure separation provides a security mechanism that allows a system to operate in numerous modes. The establishment of a secure separation to provide a security mechanism that allows a system to operate in numerous modes is not limited to two sandboxes and can be implemented for three or more sandboxes.

Accordingly, as illustrated in FIG. 1, the memory may be partitioned into a plurality of sandboxes 250, 252. In the embodiment illustrated, the memory is partitioned into a first sandbox 250 and a second sandbox 252. Each sandbox 250, 252 may be associated with separate data 227a, 227b. More particularly, each sandbox 250, 252 may be associated with a different record 291a, 291b or set of records. For example, in the example illustrated, the first sandbox 250 stores a first record 291a having a first attachment 292a and the second sandbox 252 stores a second record 291b having a second attachment 292b. For example, in at least some embodiments, one of the sandboxes 250, 252 may be associated with business records (e.g. it may be a corporate sandbox) and one of the sandboxes 250, 252 may be associated with personal records (e.g. it may be a personal sandbox).

The data port 258 may be used for synchronization with a user's host computer system (not shown). The data port 258 enables a user to set preferences through an external device or software application and extends the capabilities of the electronic device 201 by providing for information or software downloads to the electronic device 201 other than through the wireless network 101. The alternate download path may, for example, be used to load an encryption key onto the electronic device 201 through a direct, reliable and trusted connection to thereby provide secure device communication.

In some example embodiments, the electronic device 201 is provided with a service routing application programming interface (API) which provides an application with the ability to route traffic through a serial data (i.e., USB) or Bluetooth® (Bluetooth® is a registered trademark of Bluetooth SIG, Inc.) connection to the host computer system using standard connectivity protocols. When a user connects their electronic device 201 to the host computer system via a USB cable or Bluetooth® connection, traffic that was destined for the wireless network 101 is automatically routed to the electronic device 201 using the USB cable or Bluetooth® connection. Similarly, any traffic destined for the wireless network 101 is automatically sent over the USB cable Bluetooth® connection to the host computer system for processing.

The electronic device 201 includes or is connectable to a power source. In the embodiment illustrated, the power source is a battery 238, such as a rechargeable battery that may be charged, for example, through charging circuitry coupled to a battery interface 236 such as the serial data port 258. The battery 238 provides electrical power to at least some of the electrical circuitry in the electronic device 201, and the battery interface 236 provides a mechanical and electrical connection for the battery 238. The battery interface 236 is coupled to a regulator (not shown) which provides power V+ to the circuitry of the electronic device 201.

The short-range communication subsystem 262 is an additional optional component which provides for communication between the electronic device 201 and different systems or devices, which need not necessarily be similar devices. For example, the short-range communication subsystem 262 may include an infrared device and associated circuits and components, or a wireless bus protocol compliant communication mechanism such as a Bluetooth® communication module to provide for communication with similarly-enabled systems and devices.

A pre-determined set of applications that controls basic device operations, including data and possibly voice communication applications, may be installed on the electronic device 201 during or after manufacture. Additional applications and/or upgrades to an operating system 222 or software applications 224 may also be loaded onto the electronic device 201 through the wireless network 101, the auxiliary I/O subsystem 257, the data port 258, the short-range communication subsystem 262, or other suitable device subsystems 264. The downloaded programs or code modules may be permanently installed, for example, written into the program memory (i.e. the flash memory 244), or written into and executed from the RAM 246 for execution by the processor 240 at runtime.

In some example embodiments, the electronic device 201 may provide two principal modes of communication: a data communication mode and a voice communication mode. In the data communication mode, a received data signal such as a text message, an email message, or a web page download will be processed by the communication subsystem 211 and input to the processor 240 for further processing. For example, a downloaded web page may be further processed by a browser application or an email message may be processed by the email messaging application and output to the touchscreen display 204. A user of the electronic device 201 may also compose data items, such as email messages, for example, using the input interfaces 206, such as the touchscreen display 204. These composed items may be transmitted through the communication subsystem 211 over the wireless network 101.

In the voice communication mode, the electronic device 201 provides telephony functions and operates as a typical cellular phone. The overall operation is similar to the data communication mode, except that the received signals would be output to the speaker 256 and signals for transmission would be generated by a transducer such as the microphone 258. The telephony functions are provided by a combination of software/firmware (i.e., a voice communication module) and hardware (i.e., the microphone 258, the speaker 256 and input devices). Alternative voice or audio I/O subsystems, such as a voice message recording subsystem, may also be implemented on the electronic device 201. Although voice or audio signal output is typically accomplished primarily through the speaker 256, the touchscreen display 204 may also be used to provide an indication of the identity of a calling party, duration of a voice call, or other voice call related information.

The processor 240 operates under stored program control and executes software modules 220 stored in memory such as persistent memory, for example, in the flash memory 244. As illustrated in FIG. 1, the software modules 220 include operating system software 222 and software applications 224, such as one or more hybrid record access applications 226 and/or one or more attachment access applications 225.

A hybrid application is a trusted application that is capable of and permitted to concurrently access files from more than one sandbox 250, 252. That is, the hybrid application is permitted to access data from a plurality of sandboxes 250, 252 within a single instance of the hybrid application. The hybrid application may access files from a sandbox 250, 252 in which the hybrid application was initiated and may also access files from another sandbox 250, 252. The ability to access files from a plurality of sandboxes 250, 252 at the same time may be provided to the hybrid application by higher-level system components, such as a sandbox management application or module (not shown) which manages the sandboxes 250, 252 and administers a set of access rules for the sandboxes. The sandbox management application or module may, for example, be provided by the operating system 222.

Accordingly, a hybrid record access application 226 may be provided on the electronic device 201. The hybrid record access application 226 is an application that is configured and permitted to access records 291a, 291b associated with a plurality of sandboxes 250, 252. For example, the hybrid record access application 226 is an application that is configured to access records 291a from a first sandbox 250 and to concurrently access records 291b from a second sandbox 252. More particularly, a single instance of the hybrid record access application 226 may access records 291a, 291b from both the first and second sandbox 250, 252 concurrently.

In some embodiments, the hybrid record application 226 may be an electronic messaging application, such as an email application. In such embodiments, the electronic messaging application may be configured to access records 291a, 291b that are electronic messages, such as email messages. The electronic messaging application may provide for the creation of electronic messages, the display of electronic messages (such as received electronic message), composing and sending replies to electronic messages, forwarding electronic messages and/or other functions associated with electronic messages not specifically listed herein. The hybrid record application 226 may be permitted to concurrently access electronic messages associated with a plurality of sandboxes 250, 252. One or more of these electronic messages may have an attachment 292a, 292b associated therewith. For example, an email message may include an attachment.

The electronic messaging application may be configured for use with other types of electronic messages instead of or in addition to email messages. For example, in at least some embodiments, the electronic messaging application may be configured for sending and/or receiving text messages (such as short message service (SMS) messages), instant messages and/or social networking messages (i.e. electronic messages which may be transmitted via a social networking service such as Facebook™ or Linkedin™). In at least some embodiments, the electronic messaging application may be a unified messaging application that is configured to access different types of messages from a common interface.

Figure 5:
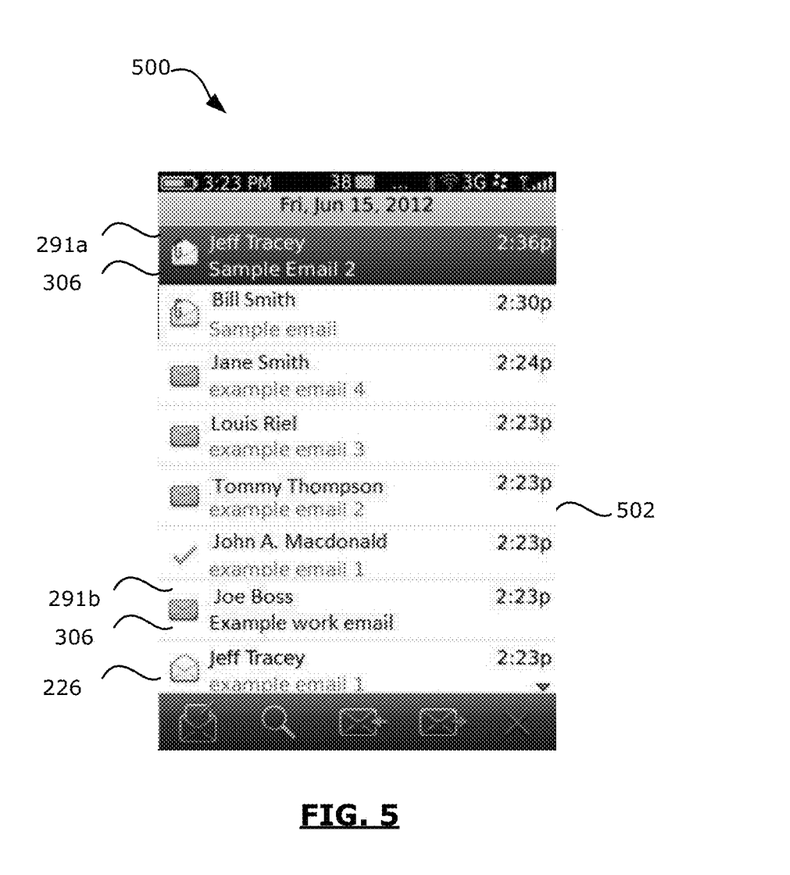
FIG. 5 is an example display screen in accordance with example embodiments of the present disclosure.

The electronic messaging application may be configured to operate in at least one operating mode in which electronic messages associated with a plurality of sandboxes are displayed concurrently. For example, in one operating mode, the hybrid electronic messaging application may display a list that includes references to electronic messages associated with a plurality of sandboxes 250, 252. Such a list may be referred to as an integrated record list 502 (FIG. 5). The hybrid electronic messaging application may allow an electronic message to be selected from the list. Such selection may cause the electronic message to be displayed more fully. In at least some embodiments, when the electronic message is displayed more fully, a selectable option to access an attachment 292a, 292b associated with the electronic message may be displayed. Activation of the selectable option may cause the attachment access application 225 to be initiated. As will be described in greater detail below, the attachment access application 225 may be initiated within the sandbox 250, 252 associated with the record that included the attachment.

In some embodiments, the hybrid record application 226 may be a calendar application. The calendar application is an application that is configured to display dates and days of the week. The calendar application may be configured to access records 291a, 291b such as calendar entries. Calendar entries are records that are associated with the calendar and that have timing information specifying when the events associated with such calendar entries are to occur. For example, calendar entries may specify a date and/or time associated with an event. By way of example and not limitation, the event may be a meeting.

When the calendar application is a hybrid application, it may concurrently access calendar entries associated with a plurality of sandboxes 250, 252. For example, the calendar application may, in some embodiments, display a hybrid calendar which includes calendar entries from a first sandbox 250 and also calendar entries from a second sandbox 252. One or more of these calendar entries may have an attachment 292a, 292b associated therewith.

The hybrid calendar application may allow a calendar entry to be selected from an at-a-glance display and/or from a reminder interface. The at-a-glance display may provide an overview of calendar entries associated with a particular time period, such as a day, week or month. A reminder interface may be a display screen that reminds a user of upcoming calendar entries. That is, the reminder interface may act as an alarm for the calendar entries. Selection of a calendar entry from the at-a-glance display or from the reminder interface may cause the calendar entry to be displayed more fully. In at least some embodiments, when the calendar entry is displayed more fully, a selectable option to access an attachment 292a, 292b associated with the calendar entry may be displayed. Activation of the selectable option may cause the attachment access application 225 to be initiated. As will be described in greater detail below, the attachment access application 225 may be initiated within the sandbox 250, 252 associated with the record (e.g. the calendar entry) that included the attachment.

The attachment access application 225 is an application that may be used for accessing the attachment. The attachment access application 225 may be a non-hybrid application. Thus, in the present example, a single instance of the attachment access application 225 is permitted to operate within a single sandbox. For example, the attachment access application 225 may only store data within the sandbox in which the instance of the attachment access application 225 is operating. That is, the attachment access application 225 may only store data within the sandbox in which the attachment access application 225 is running. Similarly, a single instance of the attachment access application 225 may be configured and/or permitted to only access data from one of the sandboxes 250, 252. The single instance of the attachment access application 225 may access data from the sandbox in which it is running but may not access data in other sandboxes.

The attachment access application 225 may take a variety of forms. By way of example, in some embodiments, the attachment access application 225 may be any one or more of the following: a web browser (which may be used when the attachment 292a, 292b is web formatted document such as a Hypertext Markup Language (HTML) document or a link (such as a URL) to a web location), a presentation application (which may be used when the attachment is an electronic presentation, such as a Powerpoint™ presentation), a portable document file (PDF) viewer (which may be used for accessing attachments that are PDF documents), a word processing application, such as a Documents to Go™ or Word™ application (which may be used for accessing attachments that are word processing documents), a media player such as an audio player, video player, or image viewer (which may be used for accessing audio, video or image attachments), a calendar application (which may be used for accessing attachments that represent calendar entries), and/or an address book application (which may be used for accessing attachments that represent contact information, such as a vCard). It will be appreciated that the attachment access application 225 may take other forms in other embodiments and may be used to access other types of attachments. A plurality of attachment access applications 225 will typically be used to allow a plurality of different types of attachments to be accessed. In such embodiments, when the selectable option to access an attachment is selected, an appropriate application for accessing that attachment may be selected and may be initiated.

Each of the software applications 224 may include layout information defining the placement of particular fields and graphic elements (e.g. text fields, input fields, icons, etc.) in the user interface (i.e. the touchscreen display 204) according to the application. In at least some example embodiments, the software applications 224 may include pre-determined gesture information defining functionalities associated with the pre-determined gestures received via the touchscreen display 204. For example, a software application 224 may determine a finger swiping movement (i.e. a pre-determined gesture) on the touchscreen display 204 as a scrolling function.

The software modules 220 or parts thereof may be temporarily loaded into volatile memory such as the RAM 246. The RAM 246 is used for storing runtime data variables and other types of data or information. Although specific functions are described for various types of memory, this is merely one example, and a different assignment of functions to types of memory could also be used.

Displaying Integrated Record List

Figure 6:
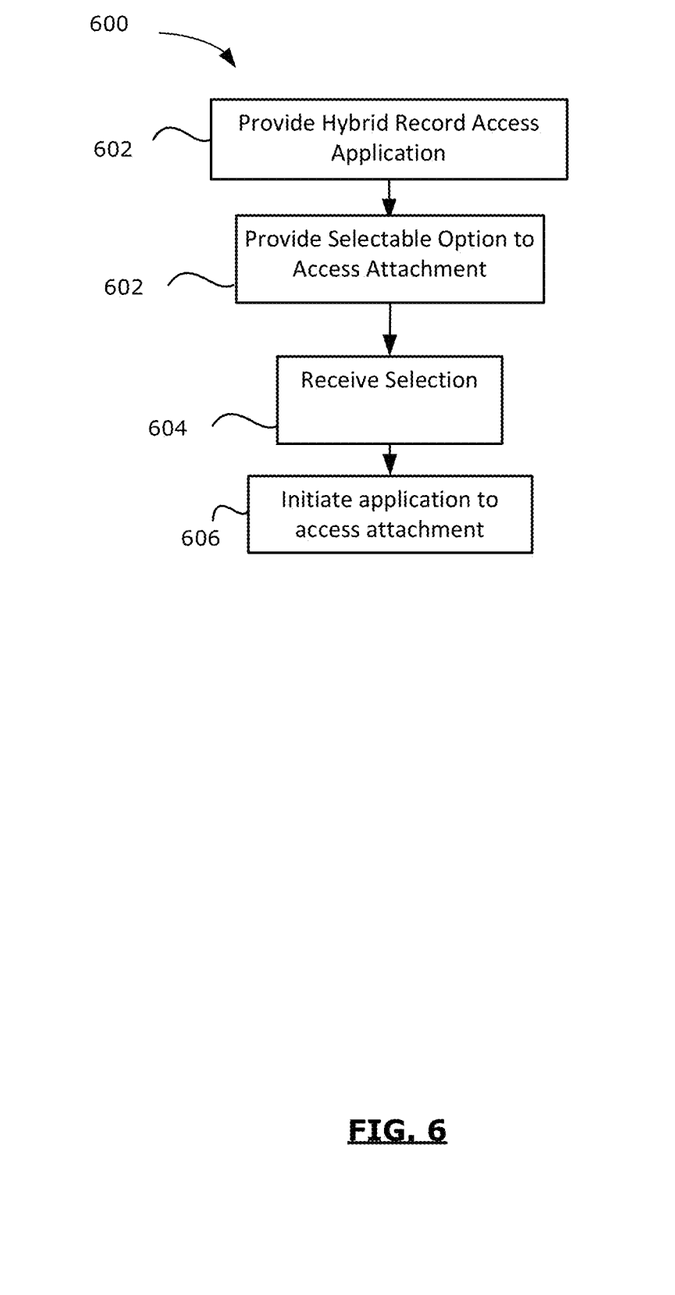
FIG. 6 is a flowchart of an example method of initiating an application to access an attachment in accordance with example embodiments of the present disclosure.

The following discussion will refer to example methods 160 (FIG. 2) and 600 (FIG. 6). Reference will be made to various example display screens to facilitate understanding of the example methods. The methods 160, 600 may, in at least some embodiments, be performed by one or more applications 224 or modules 220 associated with the electronic device 201. For example, the hybrid record access application 226, the operating system 222, and/or another application 224 stored in memory may contain processor-executable instructions which, when executed, cause the processor 240 of the electronic device 201 to perform one or more of the methods 160, 600 described below. The processor-readable instructions may be configured to cause the processor 240 to generate one or more screens having the features described below.

Figure 2:
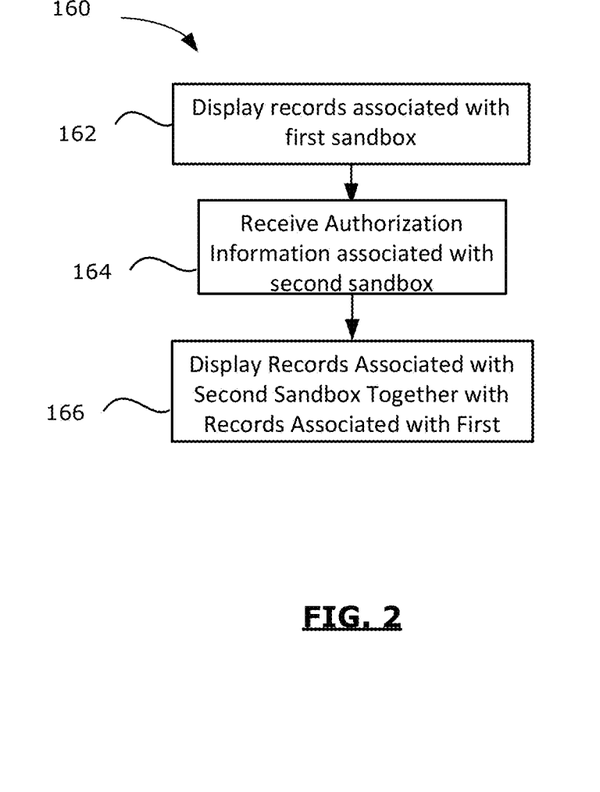
FIG. 2 illustrates a flowchart of an example method of displaying records associated with a second sandbox together with records associated with a first sandbox.

Referring now to FIG. 2, an example method 160 of authorizing a hybrid application to access a plurality of sandboxes is illustrated. The features of the method 160 will be discussed with reference to the example display screens 300, 400, 500 of FIGS. 3 to 5.

At 162, a hybrid record access application 226 (FIG. 1) selectively displays one or more records 291a, 291b on a display 204 of the electronic device 201. More particularly, the hybrid record access application 226 selectively displays one or more records 291a associated with a first sandbox 250 on the display 204. The hybrid record access application 226 may display records 291a associated with a sandbox 250 that is currently active on the electronic device 201. The sandbox 250 that is currently active may be the sandbox that was active when a request to launch the hybrid record access application 226 was received. For example, a request to launch the hybrid record access application 226 may be received when a user selects an icon or other interface element associated with the hybrid record access application 226 from a graphical user interface, such as an icon grid, provided on a display of the electronic device.

The hybrid record access application 226 may, at 162, be prevented from displaying records 291b associated with the second sandbox 252 on the display 204. For example at 162, the hybrid record access application 226 may be prevented from displaying records 291b associated with a sandbox that was not active when the request to launch the hybrid record access application 226 was received.

In at least some embodiments, the electronic device 201 may be configured to provide a corporate sandbox associated with work-related records and a personal sandbox associated with personal records. In at least some embodiments, at 162, records associated with the personal sandbox may be displayed while records associated with the corporate sandbox may be prevented from being displayed.

Figure 3:
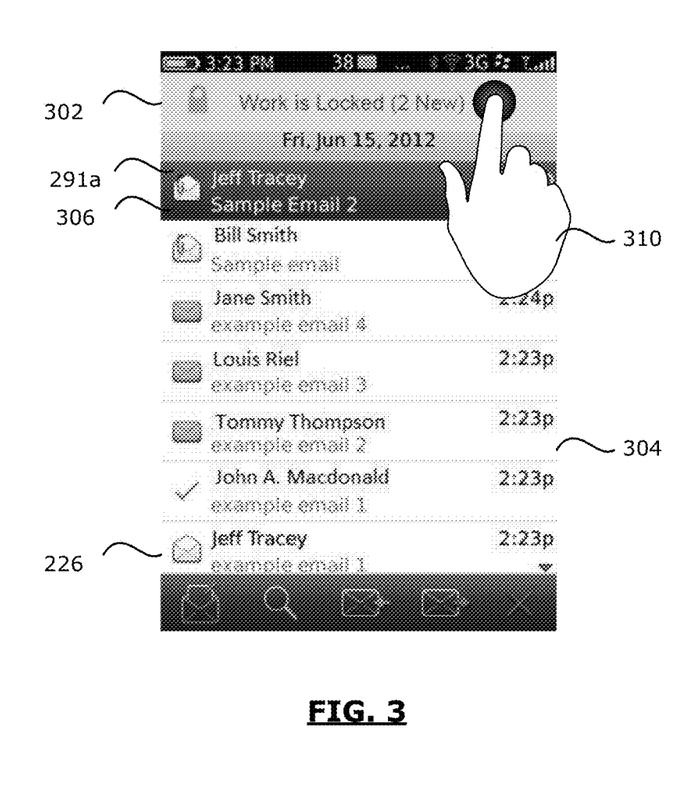
FIG. 3 is an example display screen in accordance with example embodiments of the present disclosure.

Referring now to FIG. 3, an example display screen 300 is illustrated. The example display screen 300 may be provided by a hybrid record access application 226. The example display screen 300 displays a first sandbox record list 304 that includes a plurality of records 291a associated with the first sandbox 250. In the example embodiment illustrated, the first sandbox 250 is a personal sandbox and the records 291a are electronic messages and, more particularly, are email messages 306.

The display screen 300 includes a selectable option 302 to allow the hybrid record access application 226 to access records 291b associated with a second sandbox 252. In the example illustrated, the selectable option 302 identifies a locked state associated with the second sandbox (i.e. it indicates to a user that the second sandbox 252 is locked) and also identifies the number of new records associated with the second sandbox 252 (e.g. it includes an indication of the number of unread records).

The selectable option 302 to allow the hybrid record access application 226 to access records 291b associated with a second sandbox 252 may be selected via an input interface 206 associated with the electronic device 201. In the example illustrated, the selectable option 302 may be selected using a touchscreen display 204; a hand 310 may activate the selectable option 302 with a tap or touch at an area of the display 204 associated with the selectable option 302.

Figure 4:
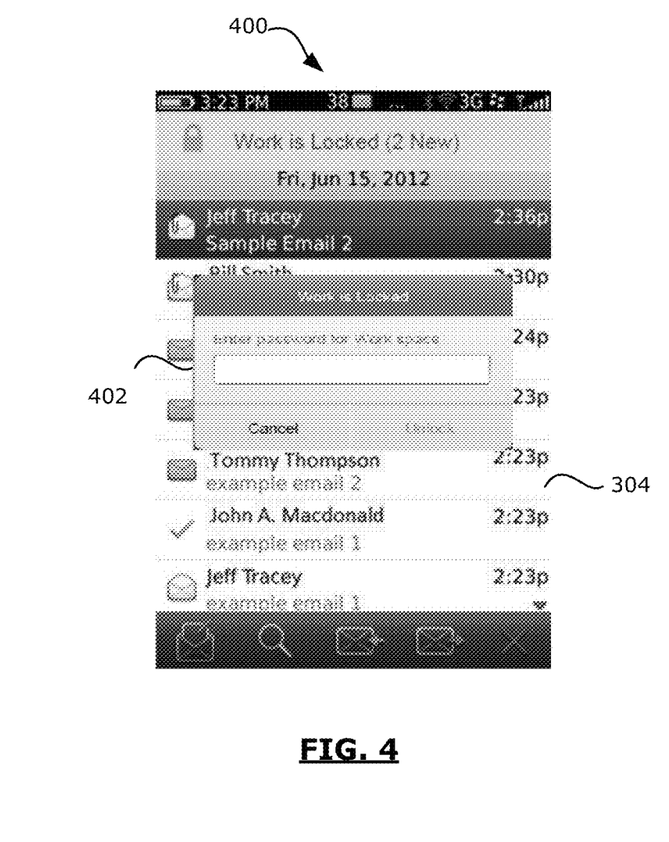
FIG. 4 is an example display screen in accordance with example embodiments of the present disclosure.

Referring now to FIG. 4, in at least some embodiments, selection of the selectable option 302 to allow the hybrid record access application 226 to access records 291b associated with a second sandbox 252 may cause a further display screen 400 to be displayed on the display 204. The further display screen 400 may include an authorization information input component 402. The authorization information input component 402 is an interface element that is configured to receive authorization information associated with the second sandbox 252. The authorization information may, for example, be a password associated with the second sandbox 252. The authorization information may be input to the electronic device via one or more input interface 206 associated with the electronic device 201. For example, a keyboard (which may be a physical keyboard or virtual keyboard) may be used for inputting the authorization information. It will be appreciated that other methods may be used for receiving authorization information in other embodiments and that other types of authorization information may be used. For example, in some embodiments, biometric data may be used to authorize access to the second sandbox 252.

In the example embodiment illustrated, the authorization information input component 402 is overlaid on the display screen 300 of FIG. 3. More particularly, the authorization information input component 402 is displayed over the first sandbox record list 304.

Referring again to FIG. 2, at 164 authorization information associated with the second sandbox 252 may be received. Such authorization information may be received via the authorization information input component 402 of the display screen 400 of FIG. 4.

The received authorization information may be authenticated to ensure that the received authorization information is authorization information associated with the second sandbox 252. More particularly, the received input may be compared with other authorization information securely stored in memory.

If the received authorization information is confirmed to be authentic (e.g. if the received authorization information is, in fact, authorization information associated with the second sandbox), then at 166 the hybrid record access application 226 displays one or more records associated with the second sandbox 252 together with the record associated with the first sandbox 250.

That is, in response to receiving the authorization information associated with the second sandbox, the hybrid record access application 226 displays records associated with the second sandbox together with the records associated with the first sandbox.

Referring now to FIG. 5, an example of a display screen 500 that displays records 291b associated with the second sandbox 252 together with the records 291a associated with the first sandbox 250 is illustrated. The example display screen 500 may be provided by a hybrid record access application 226. The example display screen 500 displays an integrated record list 502 that includes a plurality of records 291a, 291b associated with a plurality of sandboxes. In the example embodiment illustrated, the first sandbox 250 is a personal sandbox and the records 291a associated with the first sandbox 250 are electronic messages and, more particularly, are email messages 306. In the example embodiment illustrated, the second sandbox 252 is a corporate sandbox and the records 291b associated with the second sandbox 252 are electronic messages and, more particularly, are email messages 306.

In the example illustrated, the records 291a associated with the first sandbox 250 and the records 291b associated with the second sandbox 252 are integrated into a common list. In one example, the order of the list depends on metadata associated with the records 291a, 291b and does not depend on the sandbox associated with the records 291a, 291b. That is, a record will have a position in the list irrespective of whether the record is associated with the first sandbox 250 or the second sandbox 252. The list may, therefore, intermingle records from the first sandbox 250 with records from the second sandbox 252.

By way of example, in the embodiment illustrated, the records 291a, 291b are sorted in chronological order according to a time associated with the records. In the example illustrated, more recent records are displayed higher in the integrated record list 502 than older records. It will, however, be appreciated that the integrated record list 502 could be sorted based on other metadata associated with the records such as, for example, the subjects associated with the records or senders or recipients associated with the records.

In the example illustrated, the selectable option 302 (FIG. 3) to allow the hybrid record access application 226 to access records 291b associated with a second sandbox 252 is not included in the display screen 500.

Accessing Attachments

Referring now to FIG. 6, a method 600 of accessing an attachment 292a, 292b associated with a record is illustrated. The method 600 may, in at least some embodiments, be performed following the method 160 of FIG. 2.

At 602, the method 600 includes providing a hybrid record access application 226 (FIG. 1). As noted above, the hybrid record access application is configured to access records 291a, 291b associated with a plurality of sandboxes 250, 252 within a single instance of the hybrid record access application 226. The sandboxes 250, 252 are described in greater detail above. As discussed more fully above, the sandboxes 250, 252 may be configured such that data is prevented from moving between different sandboxes. For example, data accessed from within one sandbox 250, 252 may not be saved to another sandbox 250, 252. For example, when a user accesses a document from a first sandbox 250, any attempts to save that document (e.g. by selecting a "save as" option) will allow the document to be saved to locations within the first sandbox 250 but not to locations within the second sandbox 252.

As further noted above, the sandboxes may be configured such that a non-hybrid application (such as an application to access an attachment to a record) is permitted to store data to the sandbox in which the application was initiated but is prevented from storing data in another sandbox.

In at least some embodiments, providing a hybrid record access application 226 (FIG. 1) may include, for example, steps of initiating, launching and/or running the hybrid record access application 226 from the electronic device 201. In at least some embodiments, the hybrid record access application 226 may be launched in response to the receipt of a request to launch the hybrid record access application 226. For example, a request to launch the hybrid record access application 226 may be received when a user selects an icon or other interface element associated with the hybrid record access application 226 from a graphical user interface, such as an icon grid, provided on a display of the electronic device.

In at least some embodiments, when the hybrid record access application 226 is run, various display screens 300, 400, 500 associated with the hybrid record access application 226 may be displayed on the display 204 associated with the electronic device 201.

The hybrid record access application 226 is configured to be operated in at least one operating mode in which it is capable of accessing both records 291a associated with a first sandbox 250 and records 291b associated with a second sandbox 252. For example, the hybrid record access application 226 may provide for the display of an integrated record list 502 (FIG. 5) of the type described above.

As noted above, in some embodiments, the hybrid record access application 226 is an electronic messaging application which may be associated with and access records that are electronic messages. The hybrid record access application 226 may, in other embodiments, be a calendar application. In such embodiments, the records may be calendar entries.

At 604, a selectable option 702 (FIG. 7) to access an attachment 292a, 292b associated with a record 291a, 291b may be provided within the hybrid record access application 226. The record may be associated with the first sandbox 250 or the second sandbox 252. The selectable option may, for example, be a selectable option to view, open, or otherwise access the attachment.

Figure 7:
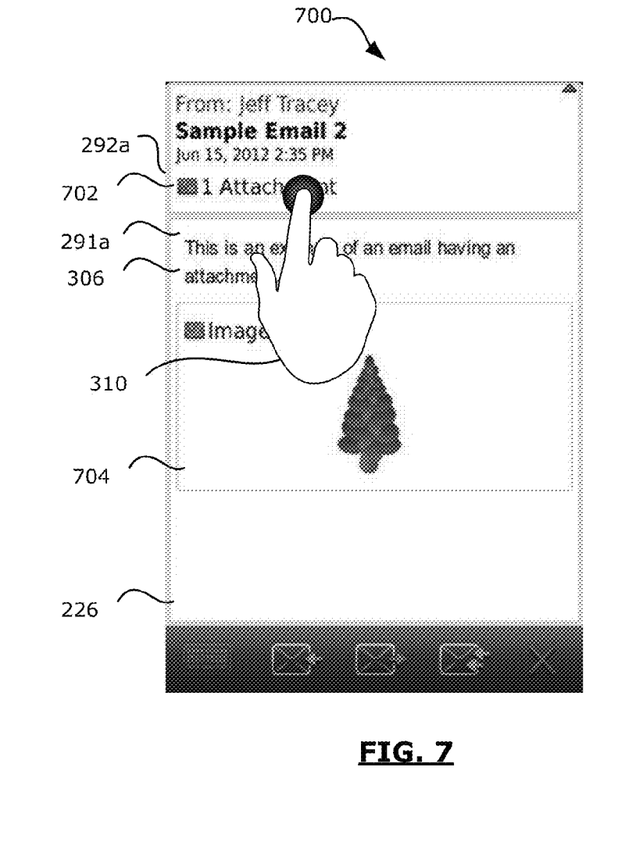
FIG. 7 is an example display screen in accordance with example embodiments of the present disclosure.

Referring now to FIG. 7, an example display screen 700 having a selectable option 702 to access an attachment 292a is illustrated. In the embodiment illustrated, the attachment 292a is associated with a record 291a that is associated with the first sandbox 250. The record 291a is, in the example illustrated, an email message 306. The example display screen 700 of FIG. 7 may, for example, be displayed in response to selection of a record 291a displayed in the integrated record list of FIG. 5.

The display screen 700 may be provided by the hybrid record access application 226. In the example illustrated, the display screen includes an attachment preview window 704 which may be used for previewing the attachment.

The selectable option 702 to access an attachment 292a may be selected via an input interface 206 associated with the electronic device 201. In the example illustrated, the selectable option 702 may be selected using a touchscreen display 204; a hand 310 may activate the selectable option 702 with a tap or touch at an area of the display 204 associated with the selectable option 702. Other input methods may be used in other embodiments.

Accordingly, referring again to FIG. 6, at 606 a selection of the selectable option 702 to access the attachment 292a may be received. At 608, in response to receiving selection of the selectable option 702, the hybrid record access application 226 may initiate an application to access the attachment within the sandbox associated with the record 291a. That is, an attachment access application 225 (which is a non-hybrid application) may be initiated, launched and/or run in the sandbox that is associated with the record to which the attachment is attached. The attachment access application 225 is a non-hybrid application and may be configured to access data associated with the sandbox where the application is initiated and which is prevented from accessing data associated with another sandbox.

In at least some embodiments, at 608, the hybrid record access application 226 may initiate the application to access the attachment in the sandbox associated with the record associated with the attachment irrespective of the sandbox that was active at the time the selection of the selectable option 702 was received (at 606). That is, the selection of a sandbox which will be used for accessing the attachment does not depend on the sandbox that was active at the time the selection was received. For example, if the attachment is associated with a corporate record (i.e. a record associated with a corporate sandbox), the application to access the attachment will operate in the corporate sandbox even if the electronic device 201 was operating in a "personal mode" (in which the personal sandbox is the active sandbox) at the time the selection was received. For example, if the hybrid record access application 226 was initially launched when the electronic device 201 was operating in a personal sandbox, the electronic device 201 may continue to operate in a personal sandbox mode. However, when a selectable option to access an attachment associated with a record stored in the corporate sandbox is received, an attachment access application 225 may be run in the corporate sandbox.

Accordingly, in at least some embodiments, at 608, the hybrid record access application 226 may identify the sandbox associated with the record to which the attachment is attached and may run the application to access the attachment in the identified sandbox.

Figure 8:
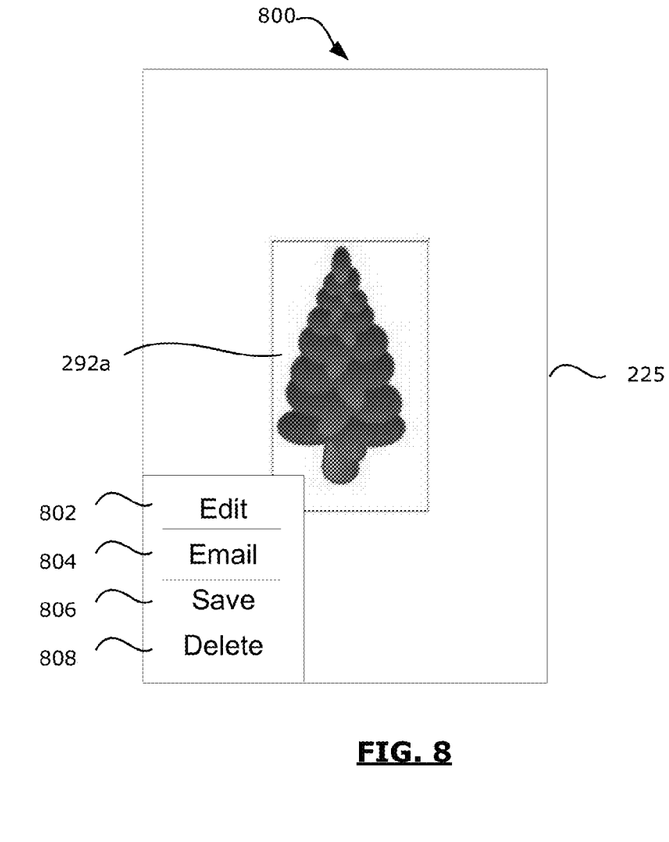
FIG. 8 is an example display screen in accordance with example embodiments of the present disclosure.

Referring now to FIG. 8, an example of a display screen 800 of an attachment access application 225 is illustrated. In the example illustrated, the display screen 800 is provided by an image viewing application and the attachment 292a represents an image. In the example illustrated, the attachment access application 225 is operating in the first sandbox 250 since the attachment 292a is associated with a record 291a associated with the first sandbox 250.

The example display screen 800 includes a selectable edit option 802. The selectable edit option may be used for receiving instructions to initiate editing of the attachment.

The example illustrated also includes a selectable share option 804. The selectable share option 804 allows the attachment 292a to be shared; for example, with other users, applications, devices or systems. By way of example, the selectable share option may be an option to email the attachment 292a.

In at least some embodiments, the selectable share option 804 is configured to operate based on the sandbox in which the attachment access application is operating. For example, different sharing options may be provided when the attachment access application 225 is operating in the first sandbox 250 than are provided when the attachment access application 225 is operating in the second sandbox 252. For example, when the attachment access application 225 is operating in a personal sandbox, a user may be permitted to email the attachment using a personal email account and not a corporate email account and when the attachment access application is operating in a corporate sandbox, a user may be permitted to email the attachment using a corporate email account and not a personal email account.

The example illustrated also includes a selectable store option 806. The selectable store option 806 allows the attachment 292a to be stored in a specified location in memory of the electronic device 201. In at least some embodiments, the store option 806 may allow the attachment to be stored in the sandbox 250 in which the attachment access application is operating but not the other sandbox 252. For example, if the attachment access application 225 is operating in the first sandbox 250, it may be permitted to store the attachment 292a in the first sandbox 250 but not the second sandbox 252.

While the present application is primarily described in terms of methods, a person of ordinary skill in the art will understand that the present application is also directed to various apparatus such as an electronic device 201 including a mobile communications device. The electronic device 201 includes components for performing at least some of the aspects and features of the described methods, which may be by way of hardware components (such as the memory 244 and/or the processor 240), software or any combination of the two, or in any other manner. Moreover, an article of manufacture for use with the apparatus, such as a pre-recorded storage device or other similar computer readable storage medium including program instructions recorded thereon, or a computer data signal carrying computer readable program instructions may direct an apparatus to facilitate the practice of the described methods. For example, a compute readable storage medium may include computer executable instructions for performing one or more of the methods described herein. It is understood that such apparatus and articles of manufacture also come within the scope of the present application.

The term "computer readable medium" or "computer readable storage medium" as used herein means any medium which can store instructions for use by or execution by a computer or other computing device including but not limited to, a portable computer diskette, a hard disk drive (HDD), a random access memory (RAM), a read-only memory (ROM), an erasable programmable-read-only memory (EPROM) or flash memory, an optical disc such as a Compact Disc (CD), Digital Versatile Disc (DVD) or Blu-ray™ Disc, and a solid state storage device (e.g., NAND flash or synchronous dynamic RAM (SDRAM)).

Example embodiments of the present application are not limited to any particular operating system, system architecture, mobile device architecture, server architecture, or computer programming language.

The various example embodiments presented above are merely examples. Variations of the innovations described herein will be apparent to persons of ordinary skill in the art, such variations being within the intended scope of the present application. In particular, features from one or more of the above-described example embodiments may be selected to create alternative example embodiments including a sub-combination of features which may not be explicitly described above. In addition, features from one or more of the above-described example embodiments may be selected and combined to create alternative example embodiments including a combination of features which may not be explicitly described above. Features suitable for such combinations and sub-combinations would be readily apparent to persons skilled in the art upon review of the present application as a whole. The subject matter described herein and in the recited claims intends to cover and embrace all suitable changes in technology.

The invention claimed:

1. A method comprising:
providing within a hybrid record access application, a first selectable option to access an attachment associated with a record, the record being associated with one of a plurality of sandboxes, the hybrid record access application configured to access records associated with the plurality of sandboxes, the plurality of sandboxes configured to prevent data from moving between different sandboxes;
initiating within the sandbox associated with the record, an application to access the attachment when selection of the first selectable option is received;
displaying records associated with a first sandbox of the plurality of sandboxes; and providing a second selectable option identifying a locked state associated with a second sandbox of the plurality of sandboxes, the second selectable option indicating to a user that the second sandbox is locked.

2. The method of claim 1, wherein the hybrid record access application includes an electronic messaging application and wherein the record includes an electronic message.

3. The method of claim 1, wherein the hybrid record access application includes a calendar application and wherein the record includes a calendar entry.

4. The method of claim 1, further comprising, within a single instance of the hybrid record access application:
displaying records associated with a first sandbox;
receiving authorizing information associated with a second sandbox; and
displaying records associated with the second sandbox together with the records associated with the first sandbox.

5. The method of claim 1, wherein the plurality of sandboxes includes a work-related sandbox associated with work-related records and a personal sandbox associated with personal records.

6. The method of claim 1, wherein initiating an application to access the attachment comprises:
initiating the application to access the attachment in the sandbox associated with the record irrespective of the sandbox that was active at the time the selection of the selectable option was received.

7. The method of claim 1, wherein the application to access the attachment is one of: a web browser, a portable document file viewer, a presentation application, a word processing application, a media player, a calendar application and an address book application.

8. The method of claim 1, wherein initiating within the sandbox associated with the record an application to access the attachment comprises:
identifying the sandbox associated with the record; and
running the application to access the attachment in the identified sandbox.

9. The method of claim 1, wherein the application to access the attachment is a non-hybrid application that is configured to access data associated with the sandbox where the application is initiated and which is prevented from accessing data associated with another sandbox.

10. The method of claim 1, wherein providing within a hybrid record access application a selectable option comprises:
displaying a display screen associated with the hybrid record access application on a display, the display screen including an integrated record list, the list including records associated with a first sandbox and records associated with a second sandbox.

11. The method of claim 1, wherein the sandboxes are configured such that the application to access the attachment is permitted to store data to the sandbox in which the application was initiated but is prevented from storing data in another sandbox.

12. An electronic device comprising:
a display;
a memory storing records associated with a plurality of sandboxes, the sandboxes configured such that data is prevented from moving between different sandboxes; and
a processor coupled with the display and the memory, the processor being configured to:
provide within a hybrid record access application, a selectable option to access an attachment associated with a record, the record being associated with one of a plurality of sandboxes, the hybrid record access application configured to access records associated with the plurality of sandboxes;
initiate within the sandbox associated with the record, an application to access the attachment when selection of the selectable option is received;
display records associated with a first sandbox of the plurality of sandboxes; and
provide a second selectable option identifying a locked state associated with a second sandbox of the plurality of sandboxes, the second selectable option indicating to a user that the second sandbox is locked.

13. The electronic device of claim 12, wherein the hybrid record access application includes an electronic messaging application and wherein the record includes an electronic message.

14. The electronic device of claim 12, wherein the hybrid record access application includes a calendar application and wherein the record includes a calendar entry.

15. The electronic device of claim 12, wherein the processor is further configured to, within a single instance of the hybrid record access application:
display records associated with a first sandbox;
receive authorizing information associated with a second sandbox; and
display records associated with the second sandbox together with the records associated with the first sandbox.

16. The electronic device of claim 12, wherein the plurality of sandboxes includes a work-related sandbox associated with work-related records and a personal sandbox associated with personal records.

17. The electronic device of claim 12, wherein initiating an application to access the attachment comprises:
initiating the application to access the attachment in the sandbox associated with the record irrespective of the sandbox that was active at the time the selection of the selectable option was received.

18. The electronic device of claim 12, wherein initiating within the sandbox associated with the record an application to access the attachment comprises:
identifying the sandbox associated with the record; and
running the application to access the attachment in the identified sandbox.

19. The electronic device of claim 12, wherein providing within a hybrid record access application a selectable option comprises:
displaying a display screen associated with the hybrid record access application on the display, the display screen including an integrated record list, the list including records associated with a first sandbox and records associated with a second sandbox.

20. A non-transitory processor readable storage medium comprising processor-executable instruction which, when executed, cause a processor to:
provide within a hybrid record access application, a selectable option to access an attachment associated with a record, the record being associated with one of a plurality of sandboxes, the hybrid record access application configured to access records associated with the plurality of sandboxes;
initiate within the sandbox associated with the record, an application to access the attachment when selection of the selectable option is received;
display records associated with a first sandbox of the plurality of sandboxes; and provide a second selectable option identifying a locked state associated with a second sandbox of the plurality of sandboxes, the second selectable option indicating to a user that the second sandbox is locked.

* * * * *